United States Patent
Ding (10) Patent No.: US 11,808,922 B2
(45) Date of Patent: Nov. 7, 2023

(54) CAMERA OPTICAL LENS

(71) Applicant: AAC Optics (Changzhou) Co., Ltd., Changzhou (CN)

(72) Inventor: Shujian Ding, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 353 days.

(21) Appl. No.: 17/129,938

(22) Filed: Dec. 22, 2020

(65) Prior Publication Data

US 2021/0311288 A1    Oct. 7, 2021

(30) Foreign Application Priority Data

Apr. 1, 2020  (CN) .......................... 202010247762.7

(51) Int. Cl.
- *G02B 13/00* (2006.01)
- *G02B 9/62* (2006.01)
- *G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC .... G02B 13/06; G02B 13/0015; G02B 13/04; G02B 13/0045; G02B 15/146; G02B 27/0025; G02B 9/62; G02B 9/64; H04N 5/2254; H04N 5/222
USPC ......... 359/656–658, 708, 713, 749, 756–762
See application file for complete search history.

(56) References Cited

U.S. PATENT DOCUMENTS

| | | | |
|---|---|---|---|
| 2015/0177493 A1* | 6/2015 | Asami | G02B 9/62 359/713 |
| 2017/0153448 A1* | 6/2017 | Mori | B60R 1/12 |

FOREIGN PATENT DOCUMENTS

| | | | | |
|---|---|---|---|---|
| CN | WO2021035758 A1 * | 8/2019 | | G02B 13/04 |

OTHER PUBLICATIONS

Translation of WO2021035758 (Year: 2023).*

* cited by examiner

*Primary Examiner* — Travis S Fissel
(74) *Attorney, Agent, or Firm* — W&G Law Group (57) ABSTRACT

A camera optical lens includes first to sixth lenses. The camera optical lens satisfies: $-3.00 \leq f1/f \leq -1.50$; $0.10 \leq (R5+R6)/(R5-R6) \leq 1.00$; and $1.00 \leq d8/d10 \leq 2.50$, where f denotes a focal length of the camera optical lens; f1 denotes a focal length of the first lens; R5 denotes a curvature radius of an object side surface of the third lens; R6 denotes a curvature radius of an image side surface of the third lens; d8 denotes an on-axis distance from an image side surface of the fourth lens to an object side surface of the fifth lens; and d10 denotes an on-axis distance from an image side surface of the fifth lens to an object side surface of the sixth lens. The camera optical lens can achieve good optical performance while satisfying design requirements for ultra-thin, wide-angle lenses having large apertures.

9 Claims, 9 Drawing Sheets

CAMERA OPTICAL LENS

TECHNICAL FIELD

The present disclosure relates to the field of optical lens, and more particularly, to a camera optical lens suitable for handheld terminal devices, such as smart phones or digital cameras, and camera devices, such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens conventionally equipped in mobile phone cameras adopts a three-piece or four-piece lens structure. Also, with the development of technology and the increasingly diverse demands of users, the pixel area of photosensitive devices is becoming smaller and smaller and the requirement of the system on the imaging quality is increasingly higher, five-piece and six-piece lens structures gradually emerge in lens designs. Although the common six-piece lens has good optical performance, its settings on refractive power, lens spacing and lens shape still have some irrationality, such that the lens structure cannot achieve good optical performance while satisfying design requirements for ultra-thin, large aperture design.

SUMMARY

In view of the above problems, the present disclosure provides a camera optical lens, which can achieve good optical performance while satisfying design requirements for ultra-thin lenses having large apertures.

In an embodiment, the present disclosure provides a camera optical lens. The camera optical lens includes, from an object side to an image side, a first lens having a negative refractive power, a second lens having a positive refractive power, a third lens having a negative refractive power, a fourth lens having a positive refractive power, a fifth lens having a positive refractive power, and a sixth lens having a negative refractive power. The camera optical lens satisfies following conditions: $-3.00 \leq f1/f \leq -1.50$; $0.10 \leq (R5+R6)/(R5-R6) \leq 1.00$; and $1.00 \leq d8/d10 \leq 2.50$, where f denotes a focal length of the camera optical lens; f1 denotes a focal length of the first lens; R5 denotes a curvature radius of an object side surface of the third lens; R6 denotes a curvature radius of an image side surface of the third lens; d8 denotes an on-axis distance from an image side surface of the fourth lens to an object side surface of the fifth lens; and d10 denotes an on-axis distance from an image side surface of the fifth lens to an object side surface of the sixth lens.

As an improvement, the camera optical lens further satisfies a following condition of $0.70 \leq f2/f \leq 1.50$, where f2 denotes a focal length of the second lens.

As an improvement, the camera optical lens further satisfies following conditions: $0.52 \leq (R1+R2)/(R1-R2) \leq 2.00$; and $0.02 \leq d1/TTL \leq 0.08$, where R1 denotes a curvature radius of an object side surface of the first lens; R2 denotes a curvature radius of an image side surface of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $0.04 \leq (R3+R4)/(R3-R4) \leq 0.75$; and $0.06 \leq d3/TTL \leq 0.27$, where R3 denotes a curvature radius of an object side surface of the second lens; R4 denotes a curvature radius of an image side surface of the second lens; d3 denotes an on-axis thickness of the second lens; and TTL denotes a total optical length from an object side surface of the first lens to an image plane of the camera optical lens along an optic axis.

As an improvement, the camera optical lens further satisfies following conditions: $-9.10 \leq f3/f \leq -0.90$; and $0.02 \leq d5/TTL \leq 0.07$, where f3 denotes a focal length of the third lens; d5 denotes an on-axis thickness of the third lens; and TTL denotes a total optical length from an object side surface of the first lens to an image plane of the camera optical lens along an optic axis.

As an improvement, the camera optical lens further satisfies following conditions: $5.17 \leq f4/f \leq 12203.56$; $-19.75 \leq (R7+R8)/(R7-R8) \leq 184.95$; and $0.04 \leq d7/TTL \leq 0.14$, where f4 denotes a focal length of the fourth lens; R7 denotes a curvature radius of an object side surface of the fourth lens; R8 denotes a curvature radius of the image side surface of the fourth lens; d7 denotes an on-axis thickness of the fourth lens; and TTL denotes a total optical length from an object side surface of the first lens to an image plane of the camera optical lens along an optic axis.

As an improvement, the camera optical lens further satisfies following conditions: $0.36 \leq f5/f \leq 2.52$; $0.06 \leq (R9+R10)/(R9-R10) \leq 0.98$; and $0.04 \leq d9/TTL \leq 0.18$, where f5 denotes a focal length of the fifth lens; R9 denotes a curvature radius of the object side surface of the fifth lens; R10 denotes a curvature radius of the image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens further satisfies following conditions: $-9.39 \leq f6/f \leq -0.60$; $1.24 \leq (R11+R12)/(R11-R12) \leq 9.26$; and $0.03 \leq d11/TTL \leq 0.13$, where f6 denotes a focal length of the sixth lens; R11 denotes a curvature radius of the object side surface of the sixth lens; R12 denotes a curvature radius of an image side surface of the sixth lens; d11 denotes an on-axis thickness of the sixth lens; and TTL denotes a total optical length from an object side surface of the first lens to an image plane of the camera optical lens along an optic axis.

As an improvement, the camera optical lens further satisfies a following condition: $TTL/IH \leq 1.85$, where IH denotes an image height; and TTL denotes a total optical length from an object side surface of the first lens to an image plane of the camera optical lens along an optic axis.

As an improvement, the camera optical lens further satisfies a following condition of $FOV \geq 116°$, where FOV denotes a field of view of the camera optical lens.

The present disclosure has advantageous effects in that the camera optical lens according to the present disclosure has excellent optical characteristics and also has characteristics of ultra-thin, wide-angle and large aperture, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
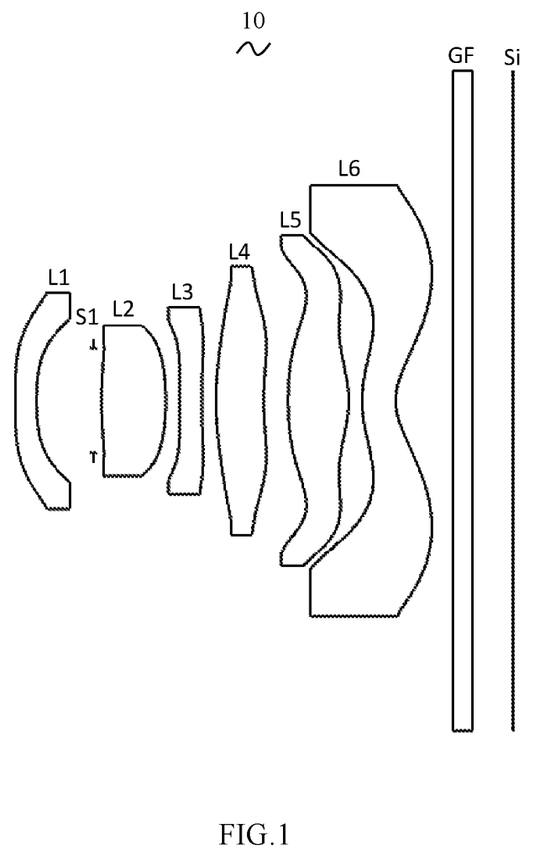
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 6 lenses. For example, the camera optical lens 10 includes, from an object side to an image side, a first lens L1, an aperture S1, a second lens L2, a third lens L3, a fourth lens L4, a fifth lens L5, and a sixth lens L6. An optical element such as an optical filter (GF) can be arranged between the sixth lens L6 and an image plane Si.

In the present embodiment, the first lens L1 has a negative refractive power, the second lens L2 has a positive refractive power, the third lens L3 has a negative refractive power, the fourth lens L4 has a positive refractive power, the fifth lens L5 has a positive refractive power, and the sixth lens L6 has a negative refractive power.

The first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

In the present embodiment, a focal length of the camera optical lens 10 is defined as f, and a focal length of the first lens L1 is defined as f1. The camera optical lens 10 should satisfy a condition of $-3.00 \leq f1/f \leq -1.50$, which specifies a ratio of the focal length f1 of the first lens L1 to the focal length f of the system. This condition facilitates to achieving a wide-angle of the system.

A curvature radius of an object side surface of the third lens L3 is defined as R5, and a curvature radius of an image side surface of the third lens L3 is defined as R6. The camera optical lens 10 should satisfy a condition of $0.10 \leq (R5+R6)/(R5-R6) \leq 1.00$, which satisfies a shape of the third lens L3. This condition can alleviate deflection of light passing through the lens while effectively reducing aberrations.

An on-axis distance from an image side surface of the fourth lens L4 to an object side surface of the fifth lens L5 is defined as d8, and an on-axis distance from an image side surface of the fifth lens L5 to an object side surface of the sixth lens L6 is defined as d10. The camera optical lens 10 should satisfy a condition of $1.00 \leq d8/d10 \leq 2.50$. When d8/d10 satisfies such a condition, a position of the fifth lens L5 can be effectively distributed, so as to correct the system curvature and improve the imaging quality.

The focal length of the camera optical lens 10 is f, and a focal length of the second lens L2 is f2. The camera optical lens 10 further satisfies a condition of $0.70 \leq f2/f \leq 1.50$, which specifies a ratio of the focal length f2 of the second lens L2 to the focal length f of the system. This condition facilitates to improving the performance of the optical system.

In the present embodiment, the first lens L1 includes an object side surface being convex in a paraxial region, and an image side surface being concave in the paraxial region.

A curvature radius of the object side surface of the first lens L1 is defined as R1, and a curvature radius of the image side surface of the first lens L1 is defined as R2. The camera optical lens 10 should satisfy a condition of $0.52 \leq (R1+R2)/(R1-R2) \leq 2.00$, which can appropriately control a shape of the first lens L1, allowing the first lens L1 to effectively correct spherical aberrations of the system. As an example, $0.84 \leq (R1+R2)/(R1-R2) \leq 1.60$.

An on-axis thickness of the first lens L1 is defined as d1, and a total optical length from the object side surface of the first lens L1 to an image plane of the camera optical lens 10 along an optic axis is defined as TTL. The camera optical lens 10 should satisfy a condition of $0.02 \leq d1/TTL \leq 0.08$, which can achieve the ultra-thin lenses. As an example, $0.03 \leq d1/TTL \leq 0.07$.

In the present embodiment, the second lens L2 includes an object side surface being convex in a paraxial region, and an image side surface being convex in the paraxial region.

A curvature radius of the object side surface of the second lens L2 is defined as R3, and a curvature radius of the image side surface of the second lens L2 is defined as R4. The camera optical lens 10 should satisfy a condition of $0.04 \leq (R3+R4)/(R3-R4) \leq 0.75$, which specifies a shape of the second lens L2. This condition can facilitate the correction of an on-axis aberration with development towards ultra-thin lenses. As an example, $0.06 \leq (R3+R4)/(R3-R4) \leq 0.60$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.06 \leq d3/TTL \leq 0.27$, which can achieve the ultra-thin lenses. As an example, $0.10 \leq d3/TTL \leq 0.21$.

In the present embodiment, the third lens L3 includes an object side surface being concave in a paraxial region, and an image side surface being concave in the paraxial region.

The focal length of the camera optical lens 10 is defined as f, and a focal length of the third lens L3 is defined as f3. The camera optical lens 10 further satisfies a condition of $-9.10 \leq f3/f \leq -0.90$. The appropriate distribution of the refractive power leads to better imaging quality and a lower sensitivity of the system. As an example, $-5.69 \leq f3/f \leq -1.13$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.02 \leq d5/TTL \leq 0.07$, which can achieve the ultra-thin lenses. As an example, $0.03 \leq d5/TTL \leq 0.05$.

The fourth lens L4 includes an object side surface being convex in a paraxial region and an image side surface being concave in the paraxial region.

The focal length of the camera optical lens 10 is f, and a focal length of the fourth lens L4 is f4. The camera optical lens 10 further satisfies a condition of $5.17 \leq f4/f \leq 12203.56$, which specifies a ratio of the focal length f4 of the fourth lens L4 and the focal length of the system. This condition can facilitate improving an optical performance of the system. As an example, $8.27 \leq f4/f \leq 9762.84$.

A curvature radius of the object side surface of the fourth lens L4 is defined as R7, and a curvature radius of the image side surface of the fourth lens L4 is defined as R8. The camera optical lens 10 should satisfy a condition of $-19.75 \leq (R7+R8)/(R7-R8) \leq 184.95$, which specifies a shape of the fourth lens L4. This can facilitate the correction of an off-axis aberration with development towards ultra-thin, wide-angle lenses. As an example, $-12.35 \leq (R7+R8)/(R7-R8) \leq 147.96$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.04 \leq d7/TTL \leq 0.14$, which can achieve the ultra-thin lenses. As an example, $0.07 \leq d7/TTL \leq 0.12$.

The fifth lens L5 includes an object side surface being convex in a paraxial region, and an image side surface being convex in the paraxial region.

The focal length of the camera optical lens 10 is f, and a focal length of the fifth lens L5 is f5. The camera optical lens 10 should satisfy a condition of $0.36 \leq f5/f \leq 2.52$. The limitations on the fifth lens L5 can effectively make a light angle of the camera lens gentle and reduce the tolerance sensitivity. As an example, $0.57 \leq f5/f \leq 2.02$.

A curvature radius of the object side surface of the fifth lens L5 is defined as R9, and a curvature radius of the image side surface of the fifth lens L5 is defined as R10. The camera optical lens 10 should satisfy a condition of $0.06 \leq (R9+R10)/(R9-R10) \leq 0.98$, which specifies a shape of the fifth lens L5. This condition can facilitate the correction of an off-axis aberration with the development towards ultra-thin lenses. As an example, $0.09 \leq (R9+R10)/(R9-R10) \leq 0.78$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.04 \leq d9/TTL \leq 0.18$, which can achieve the ultra-thin lenses. As an example, $0.06 \leq d9/TTL \leq 0.15$.

In the present embodiment, the sixth lens L6 includes an object side surface being convex in a paraxial region, and an image side surface being concave in the paraxial region.

The focal length of the camera optical lens 10 is defined as f, and a focal length of the sixth lens L6 is defined as f6. The camera optical lens 10 further satisfies a condition of $-9.39 \leq f6/f \leq -0.60$. The appropriate distribution of the refractive power leads to better imaging quality and a lower sensitivity of the system. As an example, $-5.87 \leq f6/f \leq -0.75$.

A curvature radius of the object side surface of the sixth lens L6 is defined as R11, and a curvature radius of the image side surface of the sixth lens L6 is defined as R12. The camera optical lens 10 should satisfy a condition of $1.24 \leq (R11+R12)/(R11-R12) \leq 9.26$, which specifies a shape of the sixth lens L6. This condition can facilitate the correction of an off-axis aberration with development towards ultra-thin lenses. As an example, $1.99 \leq (R11+R12)/(R11-R12) \leq 7.41$.

An on-axis thickness of the sixth lens L6 is defined as d11, and the total optical length from the object side surface of the first lens L1 to an image plane of the camera optical lens 10 along an optic axis is defined as TTL. The camera optical lens 10 should satisfy a condition of $0.03 \leq d11/TTL \leq 0.13$, which can achieve the ultra-thin lenses. As an example, $0.05 \leq d11/TTL \leq 0.10$.

In the present embodiment, an image height of the camera optical lens 10 is defined as IH, and the total optical length of the camera optical lens 10 is defined as TTL. The camera optical lens 10 should satisfy a condition of $TTL/IH \leq 1.85$, which can achieves the ultra-thin lenses.

In the present embodiment, a field of view (FOV) of the camera optical lens 10 is greater than or equal to 116°, thereby achieving the wide-angle.

In the present embodiment, an F number (FNO) of the camera optical lens 10 is smaller than or equal to 2.20, thereby leading to a large aperture and high imaging performance.

In the present embodiment, the focal length of the camera optical lens 10 is defined as f, and a combined focal length of the first lens L1 and the second lens L2 is defined as f12. The camera optical lens 10 should satisfy a condition of $0.41 \leq f12/f \leq 3.49$, which can eliminate the aberration and distortion of the camera optical lens 10, suppress the back focal length of the camera optical lens 10, and maintain miniaturization of the camera lens system group. As an example, $0.66 \leq f12/f \leq 2.79$.

When the above conditions are satisfied, the camera optical lens 10 will have good optical performance while satisfying design requirements for ultra-thin, wide-angle lenses having large apertures. With these characteristics, the camera optical lens 10 is especially suitable for high-pixel camera optical lens assembly of mobile phones and WEB camera optical lenses formed by imaging elements such as CCD and CMOS.

The following examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (total optical length from the object side surface of the first lens L1 to the image plane of the camera optical lens along the optic axis) in mm.

In an example, inflexion points and/or arrest points can be arranged on the object side surface and/or image side surface of the lens, so as to satisfy the demand for the high quality imaging. The description below can be referred to for specific implementations.

Table 1 and Table 2 shows design data of the camera optical lens 10 according to Embodiment 1 of the present disclosure.

TABLE 1

|  | R | d |  |  |  |  |
|---|---|---|---|---|---|---|
|  |  |  | nd |  | vd |  |
| S1 | ∞ | d0 = −0.814 |  |  |  |  |
| R1 | 22.236 | d1 = 0.224 | nd1 | 1.5444 | v1 | 55.82 |
| R2 | 3.153 | d2 = 0.678 |  |  |  |  |
| R3 | 4.940 | d3 = 0.670 | nd2 | 1.5444 | v2 | 55.82 |
| R4 | −2.788 | d4 = 0.145 |  |  |  |  |
| R5 | −30.524 | d5 = 0.230 | nd3 | 1.6610 | v3 | 20.53 |
| R6 | 8.861 | d6 = 0.149 |  |  |  |  |
| R7 | 2.965 | d7 = 0.501 | nd4 | 1.5444 | v4 | 55.82 |
| R8 | 3.633 | d8 = 0.254 |  |  |  |  |
| R9 | 4.116 | d9 = 0.632 | nd5 | 1.5444 | v5 | 55.82 |
| R10 | −1.155 | d10 = 0.140 |  |  |  |  |
| R11 | 1.283 | d11 = 0.349 | nd6 | 1.6610 | v6 | 20.53 |
| R12 | 0.591 | d12 = 0.596 |  |  |  |  |
| R13 | ∞ | d13 = 0.210 | ndg | 1.5168 | vg | 64.17 |
| R14 | ∞ | d14 = 0.422 |  |  |  |  |

In the table, meanings of various symbols will be described as follows.

S1: aperture;

R: curvature radius of an optical surface;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of an object side surface of the optical filter GF;

R14: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;

d14: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | 2.0000E+02 | 3.7680E−01 | −3.0039E−01 | 2.2241E−01 | −6.0946E−02 | −5.2710E−03 | −3.9727E−02 | 2.2156E−02 |
| R2 | −1.3421E+01 | 5.7786E−01 | −3.9265E−01 | 1.0391E+00 | −3.3352E+00 | 8.3763E+00 | −1.0735E+01 | 4.8368E+00 |

TABLE 2-continued

| | Conic coefficient | Aspherical surface coefficients | | | | | | |
|---|---|---|---|---|---|---|---|---|
| | k | A4 | A6 | A8 | A10 | A12 | A14 | A16 |
| R3 | −1.5775E+02 | 1.3386E−01 | −7.0366E−01 | 2.1227E+00 | −6.9864E+00 | 1.1628E+01 | −9.4842E+00 | −9.6038E−01 |
| R4 | −1.3450E+00 | −1.3026E−01 | −4.6383E−01 | 7.1423E−01 | −1.1775E+00 | 3.2394E−01 | 1.2782E+00 | −1.2069E+00 |
| R5 | 2.0000E+02 | 2.3187E−02 | −7.0043E−01 | 4.1054E−01 | 1.9266E+00 | −6.6262E+00 | 8.4140E+00 | −3.6183E+00 |
| R6 | −1.6899E+02 | 8.8004E−02 | −5.0189E−01 | 7.2947E−01 | −6.6196E−01 | 2.9294E−01 | 8.4910E−03 | −1.7742E−02 |
| R7 | −5.3109E+00 | −1.1226E−01 | 5.5526E−02 | 1.3367E−01 | −2.5565E−01 | 2.0020E−01 | −7.7556E−02 | 1.1897E−02 |
| R8 | −5.8658E+01 | −1.1196E−02 | −4.6723E−01 | 7.2560E−01 | −6.2111E−01 | 3.5023E−01 | −1.1370E−01 | 1.5338E−02 |
| R9 | 1.6535E+00 | 2.7152E−01 | −4.0767E−01 | 3.4509E−01 | −2.2986E−01 | 8.3969E−02 | −1.3628E−02 | 6.9464E−04 |
| R10 | −7.7581E+00 | 1.8397E−01 | 1.9765E−01 | −4.2073E−01 | 2.8023E−01 | −9.7478E−02 | 1.7612E−02 | −1.2819E−03 |
| R11 | −5.3515E+00 | −1.8009E−01 | 2.8841E−02 | −6.4833E−02 | 7.9604E−02 | −4.2788E−02 | 1.0878E−02 | −1.0564E−03 |
| R12 | −3.3491E+00 | −1.6907E−01 | 7.7868E−02 | −2.5766E−02 | 5.4543E−03 | −6.6950E−04 | 3.5496E−05 | 1.3637E−07 |

In Table 2, k is a conic coefficient, and A4, A6, A8, A10, A12, A14, and A16 are aspheric surface coefficients.

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

In the present embodiment, an aspheric surface of each lens surface uses the aspheric surfaces shown in the above condition (1). However, the present disclosure is not limited to the aspherical polynomial form shown in the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively, and P6R1 and P6R2 represent the object side surface and the image side surface of the sixth lens L6, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 1.005 | | | |
| P1R2 | 1 | 0.805 | | | |
| P2R1 | 1 | 0.405 | | | |
| P2R2 | 0 | | | | |
| P3R1 | 1 | 0.815 | | | |
| P3R2 | 2 | 0.395 | 0.905 | | |
| P4R1 | 1 | 1.105 | | | |
| P4R2 | 4 | 0.345 | 1.035 | 1.305 | 1.405 |
| P5R1 | 2 | 0.805 | 1.455 | | |
| P5R2 | 3 | 0.385 | 0.965 | 1.665 | |
| P6R1 | 3 | 0.455 | 1.575 | 1.735 | |
| P6R2 | 2 | 0.505 | 2.145 | | |

TABLE 4

| | Number of arrest points | Arrest point position 1 | Arrest point position 2 |
|---|---|---|---|
| P1R1 | 0 | | |
| P1R2 | 0 | | |
| P2R1 | 1 | 0.565 | |
| P2R2 | 0 | | |
| P3R1 | 0 | | |
| P3R2 | 1 | 0.605 | |
| P4R1 | 0 | | |
| P4R2 | 1 | 0.585 | |
| P5R1 | 1 | 1.115 | |
| P5R2 | 2 | 0.785 | 1.115 |
| P6R1 | 1 | 0.825 | |
| P6R2 | 1 | 1.345 | |

Figure 2:
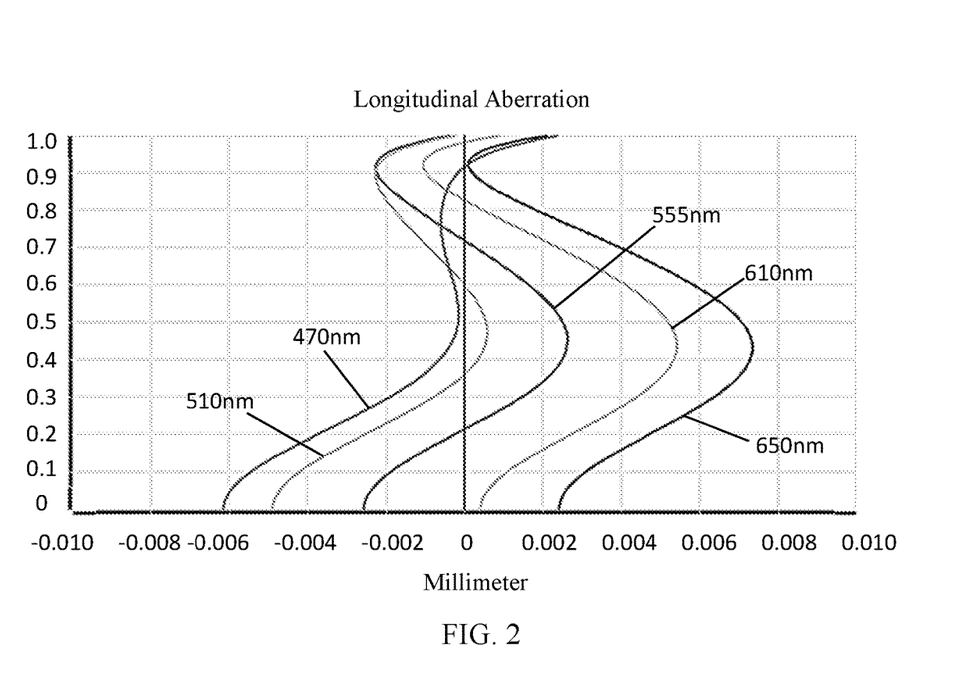
FIG. 2 is a schematic diagram of a longitudinal aberration of the camera optical lens shown in FIG. 1.
Figure 3:
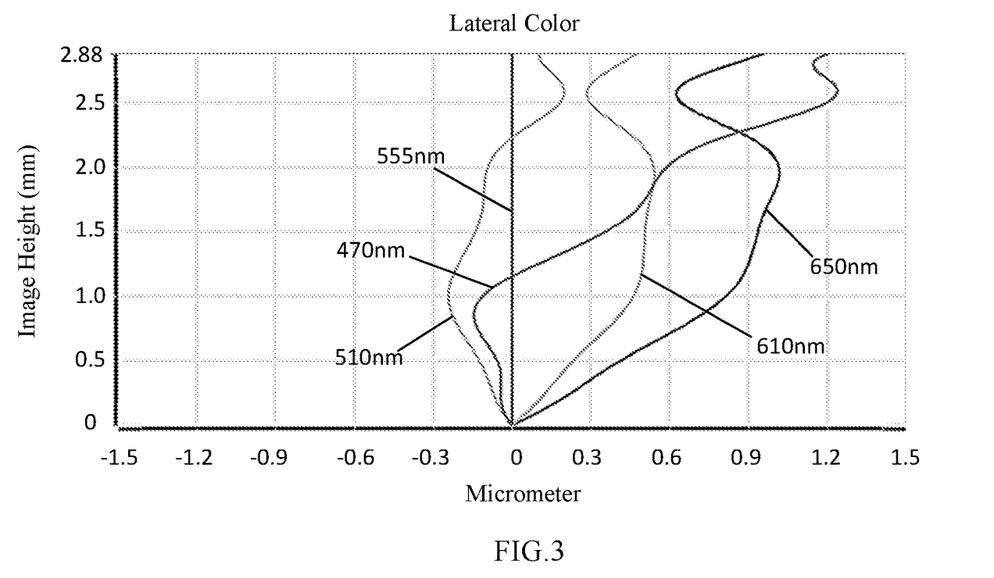
FIG. 3 is a schematic diagram of a lateral color of the camera optical lens shown in FIG. 1.
Figure 4:
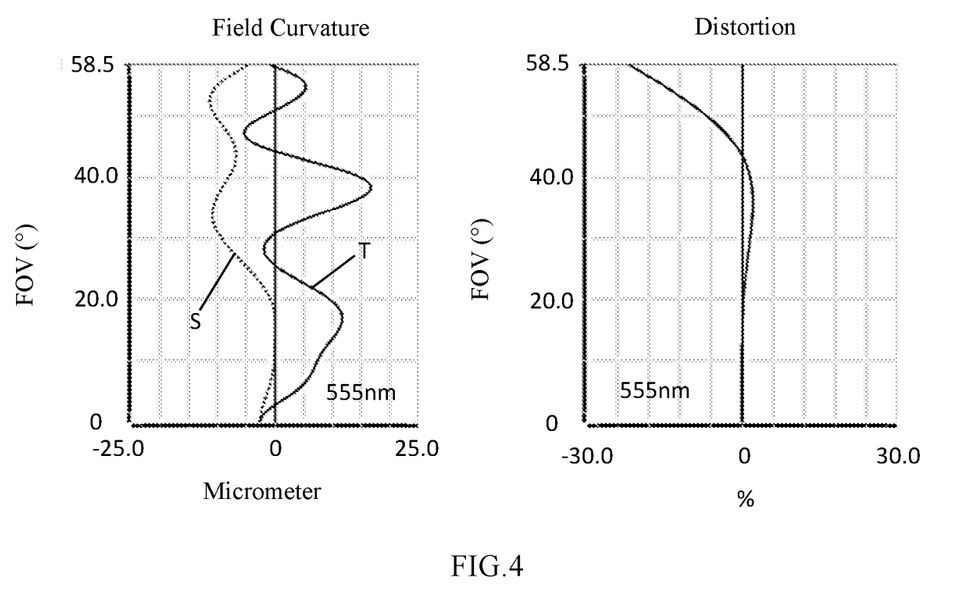
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm, and 470 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 17 below further lists various values of Embodiments 1, 2, 3, and 4 and parameters which are specified in the above conditions.

As shown in Table 17, Embodiment 1 satisfies the respective conditions.

In the present embodiment, the entrance pupil diameter of the camera optical lens is 1.027 mm. The image height is 2.88 mm. The field of view (FOV) along a diagonal direction is 116.91°. Thus, the camera optical lens 10 is an ultra-thin, wide-angle lens in which the on-axis and off-axis aberrations are sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

Figure 5:
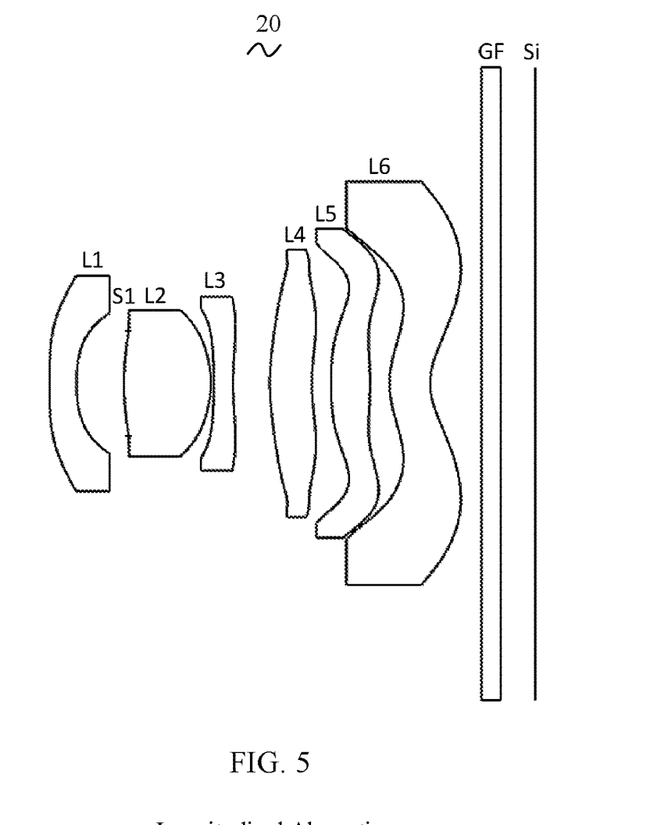
FIG. 5 is a schematic diagram of a structure of a camera optical lens in accordance with Embodiment 2 of the present disclosure.

Table 5 and Table 6 show design data of a camera optical lens 20 in Embodiment 2 of the present disclosure.

TABLE 5

|    | R        | d           |     | nd     |    | vd    |
|----|----------|-------------|-----|--------|----|-------|
| S1 | ∞        | d0 = −0.852 |     |        |    |       |
| R1 | 21.054   | d1 = 0.292  | nd1 | 1.5444 | v1 | 55.82 |
| R2 | 1.989    | d2 = 0.514  |     |        |    |       |
| R3 | 3.201    | d3 = 0.938  | nd2 | 1.5444 | v2 | 55.82 |
| R4 | −1.067   | d4 = 0.031  |     |        |    |       |
| R5 | −4.585   | d5 = 0.210  | nd3 | 1.6610 | v3 | 20.53 |
| R6 | 3.743    | d6 = 0.391  |     |        |    |       |
| R7 | 2.477    | d7 = 0.454  | nd4 | 1.5444 | v4 | 55.82 |
| R8 | 2.317    | d8 = 0.209  |     |        |    |       |
| R9 | 4.627    | d9 = 0.421  | nd5 | 1.5444 | v5 | 55.82 |
| R10 | −3.645  | d10 = 0.209 |     |        |    |       |
| R11 | 0.990   | d11 = 0.439 | nd6 | 1.6610 | v6 | 20.53 |
| R12 | 0.714   | d12 = 0.547 |     |        |    |       |
| R13 | ∞       | d13 = 0.210 | ndg | 1.5168 | vg | 64.17 |
| R14 | ∞       | d14 = 0.375 |     |        |    |       |

Table 6 shows aspheric surface data of respective lenses in the camera optical lens 20 according to Embodiment 2 of the present disclosure.

TABLE 6

| | Conic coefficient | Aspherical surface coefficients | | | | | | |
|---|---|---|---|---|---|---|---|---|
| | k | A4 | A6 | A8 | A10 | A12 | A14 | A16 |
| R1  |  1.9295E+02 |  3.3932E−01 | −3.6810E−01 |  3.8565E−01 | −2.9860E−01 |  1.2239E−01 | −2.0529E−02 |  4.5618E−04 |
| R2  | −1.6382E+00 |  5.8504E−01 | −1.9857E−01 | −4.0011E−01 |  4.3226E+00 | −1.0665E+01 |  1.2699E+01 | −6.2580E+00 |
| R3  | −2.6827E+01 |  1.1602E−01 |  4.8175E−02 | −2.1542E+00 |  1.1879E+01 | −3.7608E+01 |  6.0592E+01 | −4.1289E+01 |
| R4  | −5.5896E+00 |  4.2945E−01 | −5.2371E+00 |  2.0480E+01 | −4.8544E+01 |  6.8540E+01 | −5.3101E+01 |  1.7210E+01 |
| R5  | −2.0000E+02 |  3.8297E−01 | −3.7342E+00 |  1.2389E+01 | −2.5661E+01 |  3.2163E+01 | −2.2434E+01 |  6.7965E+00 |
| R6  | −1.8542E+02 |  1.5189E−01 | −9.8794E−01 |  2.1734E+00 | −3.0970E+00 |  2.7776E+00 | −1.4142E+00 |  3.2864E−01 |
| R7  | −9.2218E+00 | −2.0932E−01 |  4.3250E−01 | −5.2865E−01 |  4.3156E−01 | −2.2494E−01 |  6.8569E−02 | −9.6308E−03 |
| R8  | −2.4092E+01 | −4.9673E−02 | −4.0770E−01 |  7.3018E−01 | −6.6680E−01 |  3.7169E−01 | −1.1336E−01 |  1.4000E−02 |
| R9  |  2.2728E+00 |  4.1614E−01 | −6.7968E−01 |  7.3832E−01 | −6.5070E−01 |  3.3065E−01 | −8.5357E−02 |  8.9298E−03 |
| R10 | −2.6322E+00 |  1.8378E−01 |  5.5074E−01 | −1.0881E+00 |  8.2438E−01 | −3.2982E−01 |  6.8301E−02 | −5.7294E−03 |
| R11 | −3.7486E+00 | −2.7973E−01 |  1.8493E−01 | −2.8172E−01 |  2.7930E−01 | −1.4390E−01 |  3.6284E−02 | −3.5364E−03 |
| R12 | −3.0330E+00 | −1.9358E−01 |  7.9758E−02 | −1.4727E−02 | −2.8847E−03 |  1.9890E−03 | −3.6453E−04 |  2.3402E−05 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 | Inflexion point position 4 |
|---|---|---|---|---|---|
| P1R1 | 0 | | | | |
| P1R2 | 0 | | | | |
| P2R1 | 1 | 0.535 | | | |
| P2R2 | 0 | | | | |
| P3R1 | 0 | | | | |
| P3R2 | 2 | 0.365 | 0.905 | | |
| P4R1 | 1 | 1.175 | | | |
| P4R2 | 3 | 0.375 | 1.025 | 1.305 | |
| P5R1 | 2 | 0.775 | 1.435 | | |
| P5R2 | 4 | 0.295 | 0.895 | 1.625 | 1.695 |
| P6R1 | 3 | 0.445 | 1.555 | 1.695 | |
| P6R2 | 2 | 0.525 | 2.135 | | |

TABLE 8

| | Number of arrest points | Arrest point position 1 | Arrest point position 2 |
|---|---|---|---|
| P1R1 | | | |
| P1R2 | | | |
| P2R1 | | | |
| P2R2 | | | |
| P3R1 | | | |
| P3R2 | 1 | 0.615 | |
| P4R1 | 1 | 1.335 | |
| P4R2 | 1 | 0.665 | |
| P5R1 | 1 | 1.055 | |
| P5R2 | 2 | 0.485 | 1.175 |
| P6R1 | 1 | 0.845 | |
| P6R2 | 1 | 1.275 | |

Figure 6:
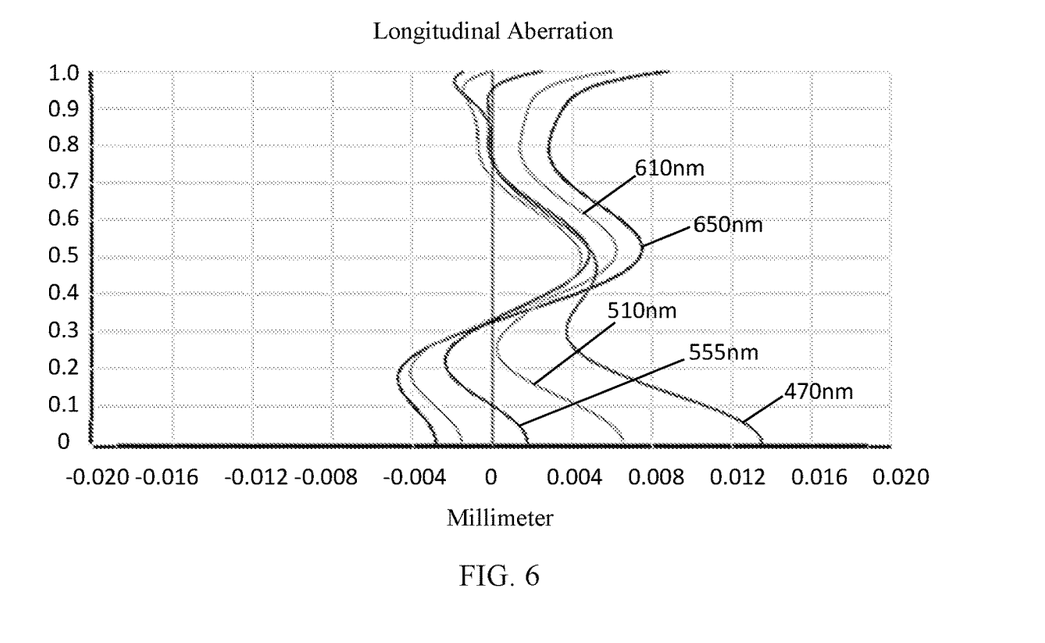
FIG. 6 is a schematic diagram of a longitudinal aberration of the camera optical lens shown in FIG. 5.
Figure 7:
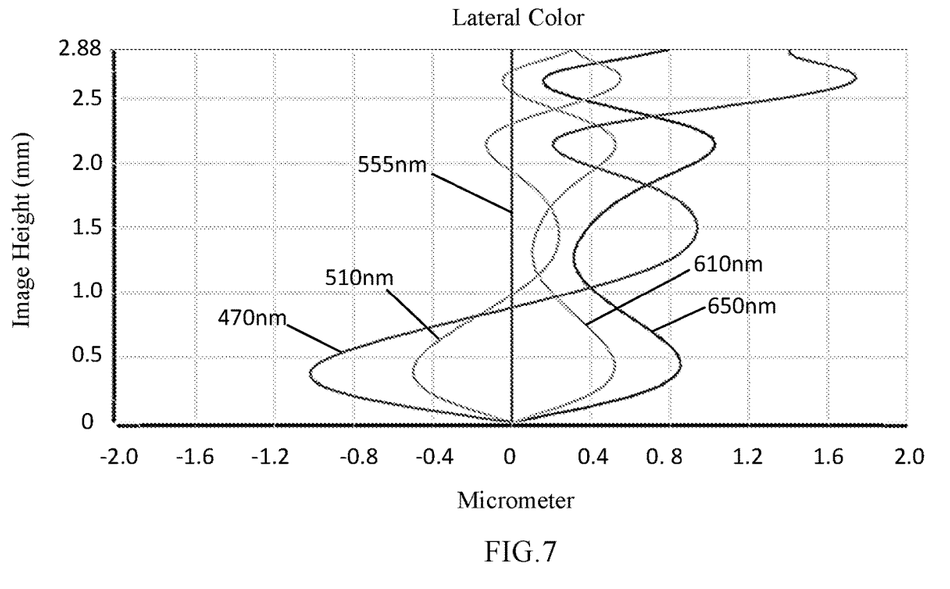
FIG. 7 is a schematic diagram of a lateral color of the camera optical lens shown in FIG. 5.
Figure 8:
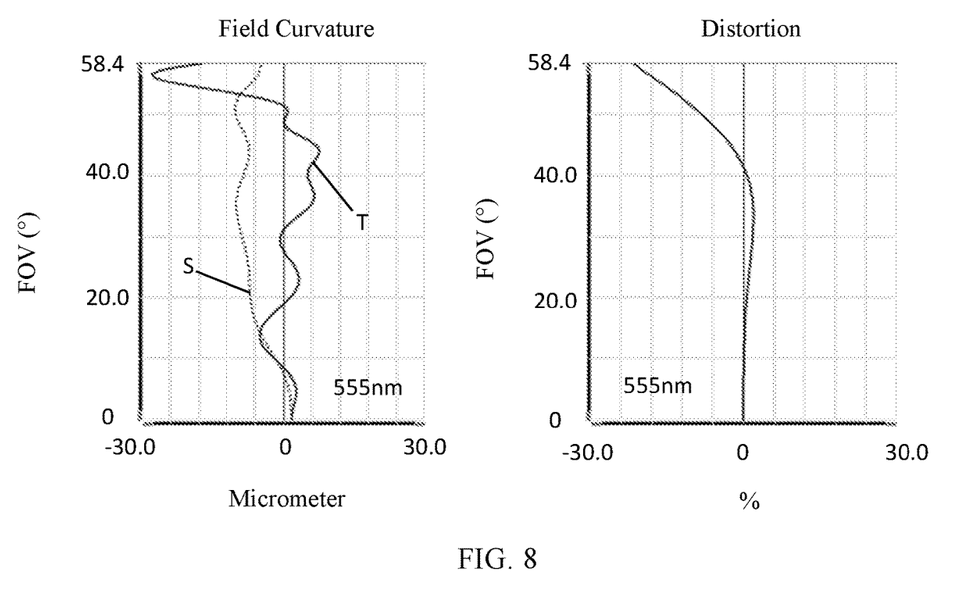
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm, and 470 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 17, Embodiment 2 satisfies the respective conditions.

In the present embodiment, the entrance pupil diameter of the camera optical lens is 1.027 mm. The image height is 2.88 mm. The FOV along a diagonal direction is 116.90°. Thus, the camera optical lens 10 is an ultra-thin, wide-angle lens in which the on-axis and off-axis aberrations are sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

Figure 9:
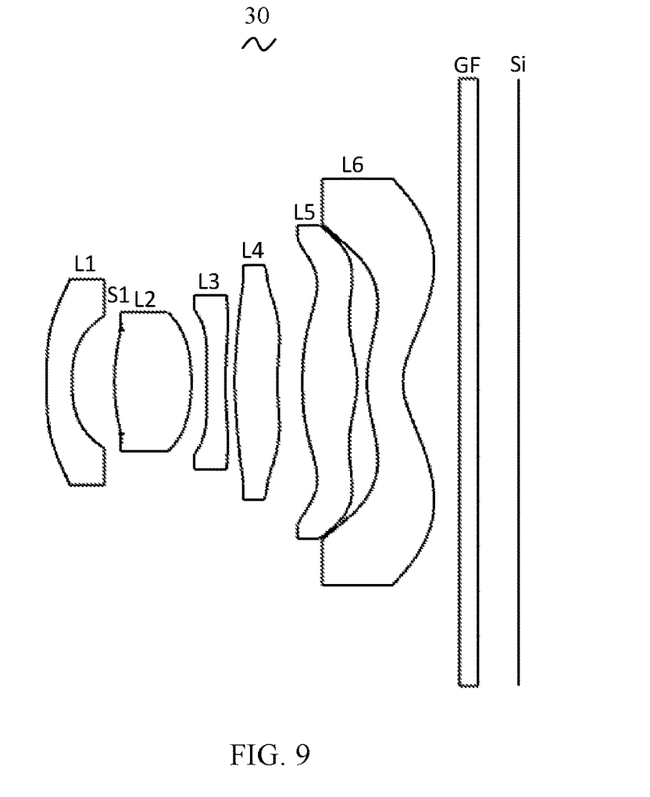
FIG. 9 is a schematic diagram of a structure of a camera optical lens in accordance with Embodiment 3 of the present disclosure.

Table 9 and Table 10 show design data of a camera optical lens 30 in Embodiment 3 of the present disclosure.

TABLE 9

|    | R          | d           |     | nd     |    | vd    |
|----|------------|-------------|-----|--------|----|-------|
| S1 | ∞          | d0 = −0.836 |     |        |    |       |
| R1 | 78.432     | d1 = 0.279  | nd1 | 1.5444 | v1 | 55.82 |
| R2 | 1.808      | d2 = 0.480  |     |        |    |       |
| R3 | 2.505      | d3 = 0.868  | nd2 | 1.5444 | v2 | 55.82 |
| R4 | −2.139     | d4 = 0.171  |     |        |    |       |
| R5 | −10471.576 | d5 = 0.210  | nd3 | 1.6610 | v3 | 20.53 |

TABLE 9-continued

| | R | d | | nd | | vd |
|---|---|---|---|---|---|---|
| R6 | 5.239 | d6 = 0.104 | | | | |
| R7 | 2.921 | d7 = 0.477 | nd4 | 1.5444 | v4 | 55.82 |
| R8 | 2.874 | d8 = 0.280 | | | | |
| R9 | 4.594 | d9 = 0.615 | nd5 | 1.5444 | v5 | 55.82 |
| R10 | −1.183 | d10 = 0.112 | | | | |
| R11 | 1.538 | d11 = 0.402 | nd6 | 1.6610 | v6 | 20.53 |
| R12 | 0.689 | d12 = 0.636 | | | | |
| R13 | ∞ | d13 = 0.210 | ndg | 1.5168 | vg | 64.17 |
| R14 | ∞ | d14 = 0.456 | | | | |

Table 10 shows aspheric surface data of respective lenses in the camera optical lens 30 according to Embodiment 3 of the present disclosure.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 1.8198E+02 | 4.0719E−01 | −5.1865E−01 | 6.0181E−01 | −5.2709E−01 | 2.7175E−01 | −7.4236E−02 | 8.7993E−03 |
| R2 | −4.2936E−01 | 6.5614E−01 | −3.0491E−01 | −7.0741E−02 | 2.3917E+00 | −3.7155E+00 | 6.6838E−01 | 1.1076E+00 |
| R3 | −1.6303E+01 | 1.5329E−01 | −7.6720E−02 | −9.8661E−01 | 5.3932E+00 | −1.8411E+01 | 3.2530E+01 | −2.5225E+01 |
| R4 | −2.0692E+00 | −1.8104E−01 | −5.9907E−01 | 2.2132E+00 | −4.9900E+00 | 6.0944E+00 | −3.6849E+00 | 5.8984E−01 |
| R5 | −2.0000E+02 | 1.0140E−02 | −1.1479E+00 | 1.9142E+00 | −1.2147E+00 | −1.0447E+00 | 1.8431E+00 | −6.2761E−01 |
| R6 | −2.0000E+02 | 1.8223E−01 | −6.9481E−01 | 7.8370E−01 | −6.7007E−02 | −7.2315E−01 | 6.4939E−01 | −1.6504E−01 |
| R7 | −1.5454E+01 | −3.3288E−01 | 9.0483E−01 | −1.5398E+00 | 1.7332E+00 | −1.2137E+00 | 4.7893E−01 | −8.2451E−02 |
| R8 | −5.8620E+01 | −1.4117E−01 | −3.9880E−01 | 1.0185E+00 | −1.2655E+00 | 9.2594E−01 | −3.5191E−01 | 5.2404E−02 |
| R9 | 3.2032E+00 | 2.5018E−01 | −4.2154E−01 | 4.0239E−01 | −2.8572E−01 | 1.1680E−01 | −2.3850E−02 | 1.9053E−03 |
| R10 | −7.3428E+00 | 2.7669E−01 | 1.1845E−02 | −2.2346E−01 | 1.6585E−01 | −5.8907E−02 | 1.0548E−02 | −7.5380E−04 |
| R11 | −4.5730E+00 | −1.4157E−01 | 1.7768E−02 | −4.5427E−02 | 5.6833E−02 | −3.0897E−02 | 7.8086E−03 | −7.4372E−04 |
| R12 | −4.1269E+00 | −9.7153E−02 | 1.5073E−02 | 6.9643E−03 | −5.2965E−03 | 1.4057E−03 | −1.7457E−04 | 8.5305E−06 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 1.025 | | |
| P1R2 | 0 | | | |
| P2R1 | 1 | 0.555 | | |
| P2R2 | 0 | | | |
| P3R1 | 2 | 0.035 | 0.055 | |
| P3R2 | 2 | 0.435 | 0.915 | |
| P4R1 | 1 | 1.055 | | |
| P4R2 | 3 | 0.285 | 0.975 | 1.225 |
| P5R1 | 2 | 0.795 | 1.485 | |
| P5R2 | 3 | 0.365 | 1.005 | 1.795 |
| P6R1 | 3 | 0.495 | 1.665 | 1.735 |
| P6R2 | 2 | 0.545 | 2.265 | |

TABLE 12

| | Number of inflexion points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 0 | | |
| P3R2 | 1 | 0.715 | |
| P4R1 | 1 | 1.185 | |
| P4R2 | 1 | 0.505 | |

TABLE 12-continued

| | Number of inflexion points | Arrest point position 1 | Arrest point position 2 |
|---|---|---|---|
| P5R1 | 1 | 1.125 | |
| P5R2 | 2 | 0.745 | 1.215 |
| P6R1 | 1 | 0.895 | |
| P6R2 | 1 | 1.365 | |

Figure 10:
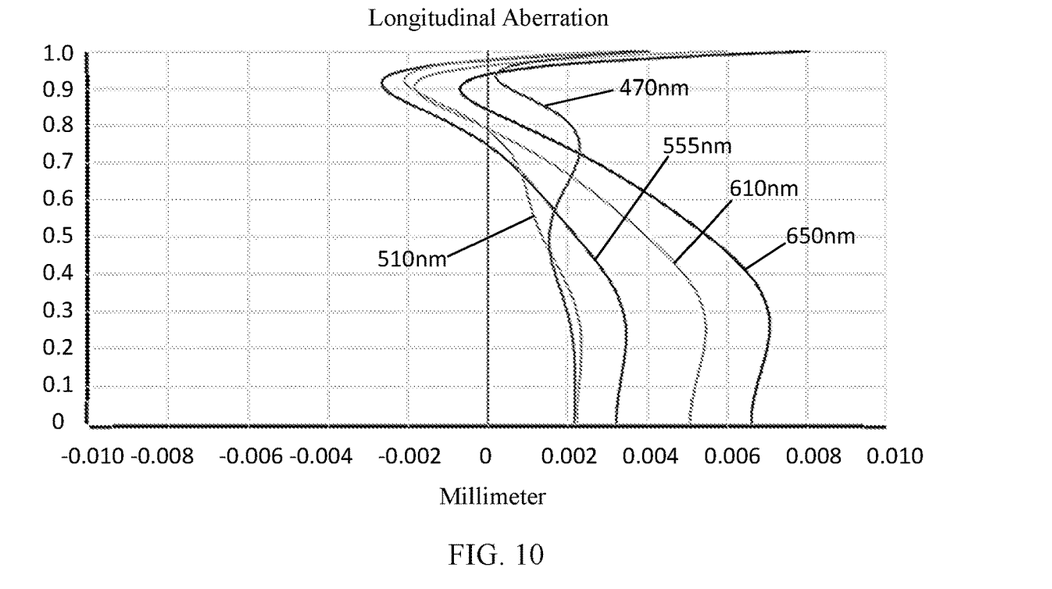
FIG. 10 is a schematic diagram of a longitudinal aberration of the camera optical lens shown in FIG. 9.
Figure 11:
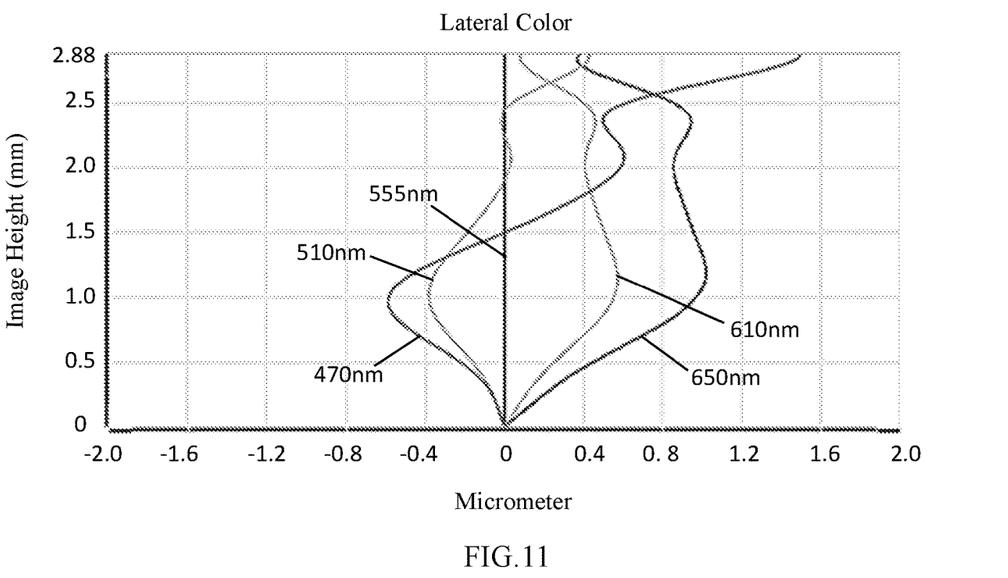
FIG. 11 is a schematic diagram of a lateral color of the camera optical lens shown in FIG. 9.
Figure 12:
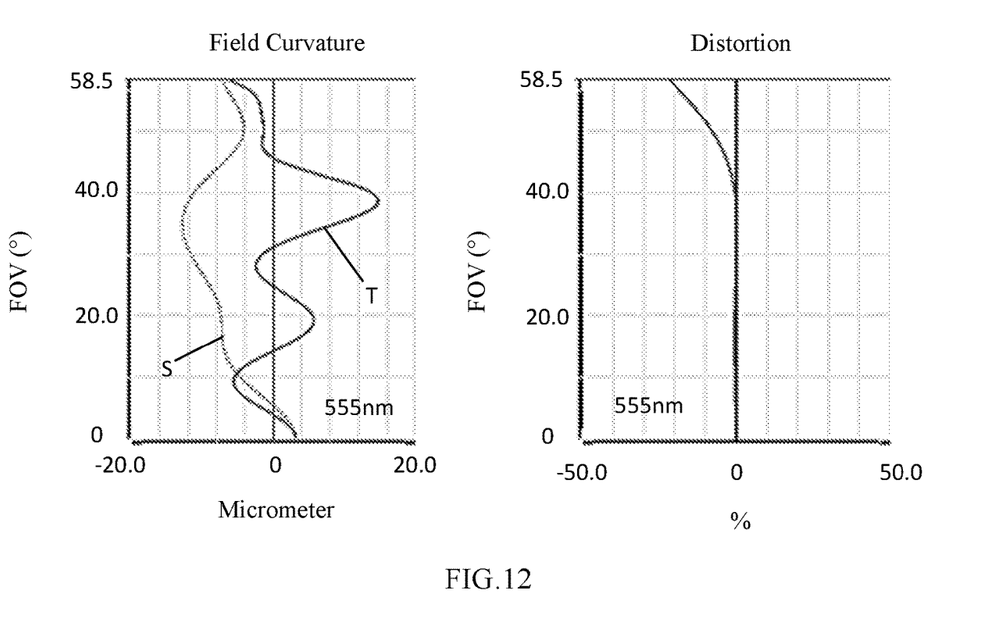
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm, and 470 nm after passing the camera optical lens 30 according to Embodiment 3. FIG. 12 illustrates field curvature and distortion of light with a wavelength of 555 nm after passing the camera optical lens 30 according to Embodiment 3.

Table 17 below further lists various values of the present embodiment and parameters which are specified in the above conditions. Obviously, the camera optical lens according to the present embodiment satisfies the above conditions.

In the present embodiment, the entrance pupil diameter of the camera optical lens is 1.027 mm. The image height is 2.88 mm. The FOV along a diagonal direction is 116.90°. Thus, the camera optical lens 10 is an ultra-thin, wide-angle lens in which the on-axis and off-axis aberrations are sufficiently corrected, thereby leading to better optical characteristics.

Embodiment 4

Embodiment 4 is basically the same as Embodiment 1 and involves symbols having the same meanings as Embodiment 1. Only differences therebetween will be described in the following.

Figure 13:
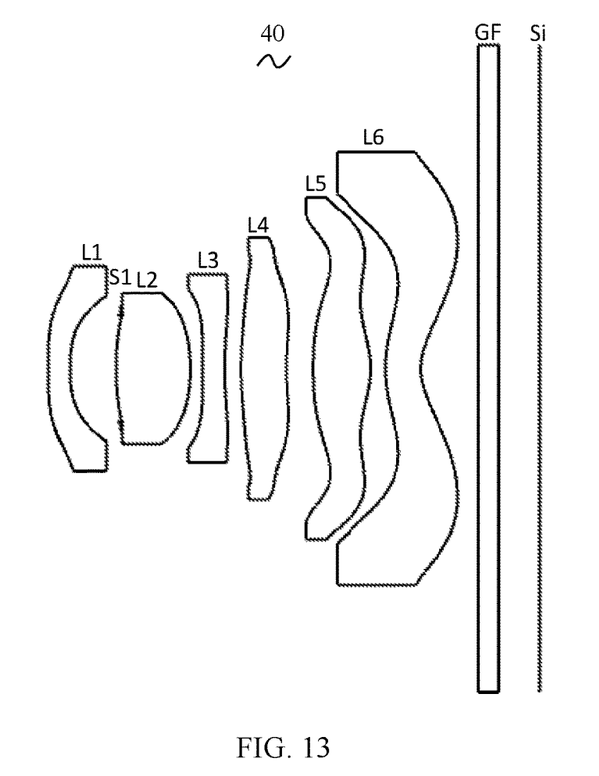
FIG. 13 is a schematic diagram of a structure of a camera optical lens in accordance with Embodiment 4 of the present disclosure.
Figure 14:
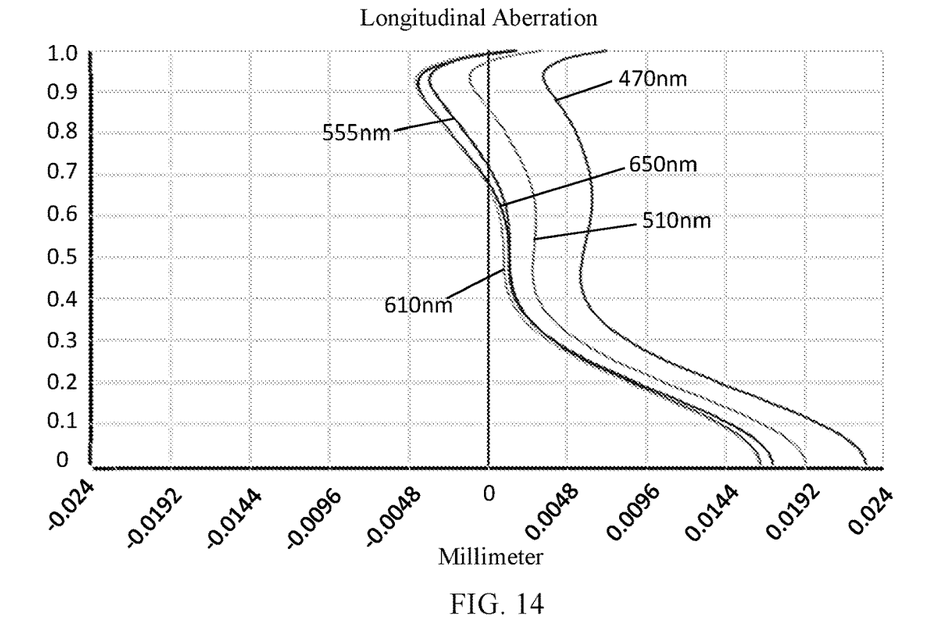
FIG. 14 is a schematic diagram of a longitudinal aberration of the camera optical lens shown in FIG. 13.

Table 13 and Table 14 show design data of a camera optical lens 40 in Embodiment 4 of the present disclosure.

TABLE 13

| | R | d | | nd | | vd |
|---|---|---|---|---|---|---|
| S1 | ∞ | d0 = −0.748 | | | | |
| R1 | 21.054 | d1 = 0.222 | nd1 | 1.5444 | v1 | 55.82 |
| R2 | 2.078 | d2 = 0.479 | | | | |
| R3 | 3.020 | d3 = 0.773 | nd2 | 1.5444 | v2 | 55.82 |
| R4 | −1.996 | d4 = 0.129 | | | | |
| R5 | −225.579 | d5 = 0.230 | nd3 | 1.6610 | v3 | 20.53 |

TABLE 13-continued

| | R | d | nd | | vd | |
|---|---|---|---|---|---|---|
| R6 | 3.999 | d6 = 0.168 | | | | |
| R7 | 2.921 | d7 = 0.469 | nd4 | 1.5444 | v4 | 55.82 |
| R8 | 2.874 | d8 = 0.279 | | | | |
| R9 | 4.908 | d9 = 0.596 | nd5 | 1.5444 | v5 | 55.82 |
| R10 | −1.028 | d10 = 0.155 | | | | |
| R11 | 1.507 | d11 = 0.369 | nd6 | 1.6610 | v6 | 20.53 |
| R12 | 0.642 | d12 = 0.597 | | | | |
| R13 | ∞ | d13 = 0.210 | ndg | 1.5168 | vg | 64.17 |
| R14 | ∞ | d14 = 0.424 | | | | |

Table 14 shows aspheric surface data of respective lenses in the camera optical lens 40 according to Embodiment 4 of the present disclosure.

TABLE 14

| | Conic coefficient | Aspherical surface coefficients | | | | | | |
|---|---|---|---|---|---|---|---|---|
| | k | A4 | A6 | A8 | A10 | A12 | A14 | A16 |
| R1 | −2.0000E+02 | 5.0178E−01 | −6.1116E−01 | 6.1985E−01 | −3.3102E−01 | −1.6978E−01 | 2.6011E−01 | −7.5780E−02 |
| R2 | −1.1395E−01 | 7.3480E−01 | −3.1500E−01 | −8.2781E−01 | 5.8228E+00 | −1.0468E+01 | 4.5229E+00 | 1.6316E+00 |
| R3 | −2.1363E+01 | 1.2933E−01 | 1.5782E−02 | −1.5205E+00 | 8.1308E+00 | −2.8939E+01 | 5.4219E+01 | −4.3506E+01 |
| R4 | −2.6115E+00 | −1.5216E−01 | −6.6740E−01 | 2.6089E+00 | −6.2788E+00 | 7.4588E+00 | −3.6973E+00 | −2.6994E−02 |
| R5 | −2.0000E+02 | −9.6941E−02 | −7.5157E−01 | 1.3251E+00 | −9.2433E−02 | −4.0042E+00 | 5.8617E+00 | −2.4445E+00 |
| R6 | −2.0000E+02 | 1.8818E−01 | −9.1264E−01 | 1.8511E+00 | −2.4085E+00 | 1.9624E+00 | −9.4432E−01 | 2.3345E−01 |
| R7 | −1.5454E+01 | −3.3288E−01 | 9.0483E−01 | −1.5398E+00 | 1.7332E+00 | −1.2137E+00 | 4.7893E−01 | −8.2451E−02 |
| R8 | −5.8620E+01 | −1.4117E−01 | −3.9880E−01 | 1.0185E+00 | −1.2655E+00 | 9.2594E−01 | −3.5191E−01 | 5.2404E−02 |
| R9 | 3.4920E+00 | 2.6515E−01 | −3.9602E−01 | 3.5401E−01 | −2.4373E−01 | 9.3333E−02 | −1.6977E−02 | 1.1434E−03 |
| R10 | −5.9283E+00 | 2.9328E−01 | 6.8693E−02 | −3.1439E−01 | 2.2293E−01 | −7.7206E−02 | 1.3475E−02 | −9.3418E−04 |
| R11 | −4.1970E+00 | −1.2030E−01 | −4.4724E−03 | −3.9263E−02 | 5.5380E−02 | −2.8909E−02 | 6.9560E−03 | −6.3491E−04 |
| R12 | −3.9391E+00 | −8.5903E−02 | −2.0386E−03 | 1.7769E−02 | −8.7059E−03 | 1.9510E−03 | −2.1553E−04 | 9.6461E−06 |

Table 15 and Table 16 show design data of inflexion points and arrest points of respective lens in the camera optical lens 40 according to Embodiment 4 of the present disclosure.

TABLE 15

| | Number of inflexion points | Inflexion point position 1 | Inflexion point position 2 | Inflexion point position 3 | Inflexion point position 4 |
|---|---|---|---|---|---|
| P1R1 | 1 | 0.895 | | | |
| P1R2 | 0 | | | | |
| P2R1 | 1 | 0.535 | | | |
| P2R2 | 0 | | | | |
| P3R1 | 1 | 0.845 | | | |
| P3R2 | 2 | 0.415 | 0.885 | | |
| P4R1 | 1 | 1.055 | | | |
| P4R2 | 4 | 0.285 | 0.975 | 1.225 | 1.395 |
| P5R1 | 2 | 0.825 | 1.485 | | |
| P5R2 | 3 | 0.375 | 1.005 | 1.735 | |
| P6R1 | 3 | 0.515 | 1.625 | 1.795 | |
| P6R2 | 2 | 0.545 | 2.185 | | |

TABLE 16

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 0 | | |
| P3R2 | 2 | 0.715 | 0.965 |
| P4R1 | 1 | 1.185 | |
| P4R2 | 1 | 0.505 | |

TABLE 16-continued

| | Number of arrest points | Arrest point position 1 | Arrest point position 2 |
|---|---|---|---|
| P5R1 | 2 | 1.135 | 1.705 |
| P5R2 | 2 | 0.745 | 1.225 |
| P6R1 | 1 | 0.915 | |
| P6R2 | 1 | 1.385 | |

Figure 15:
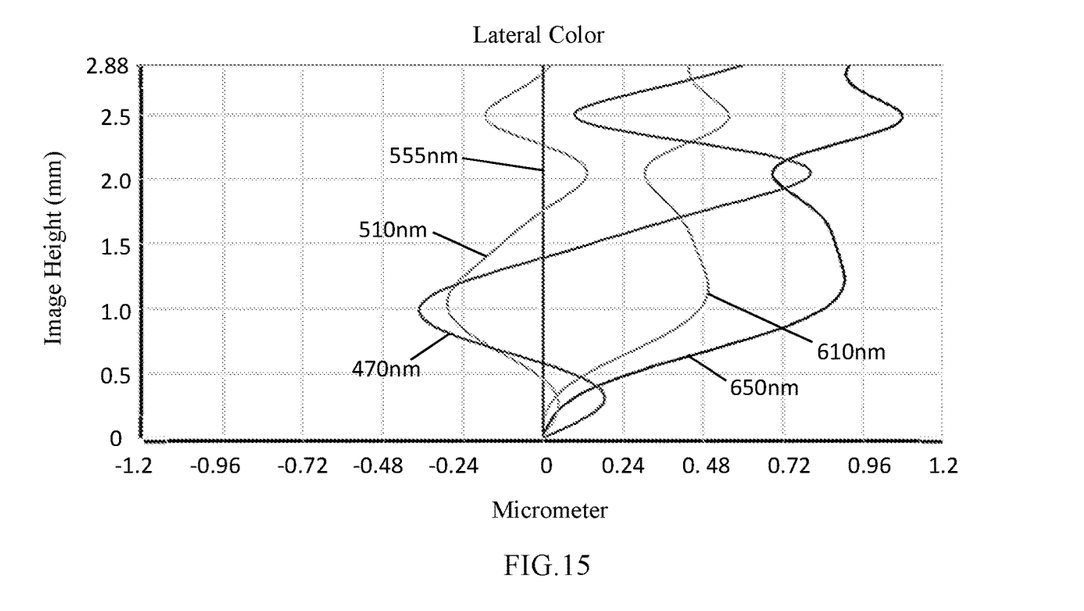
FIG. 15 is a schematic diagram of a lateral color of the camera optical lens shown in FIG. 13.
Figure 16:
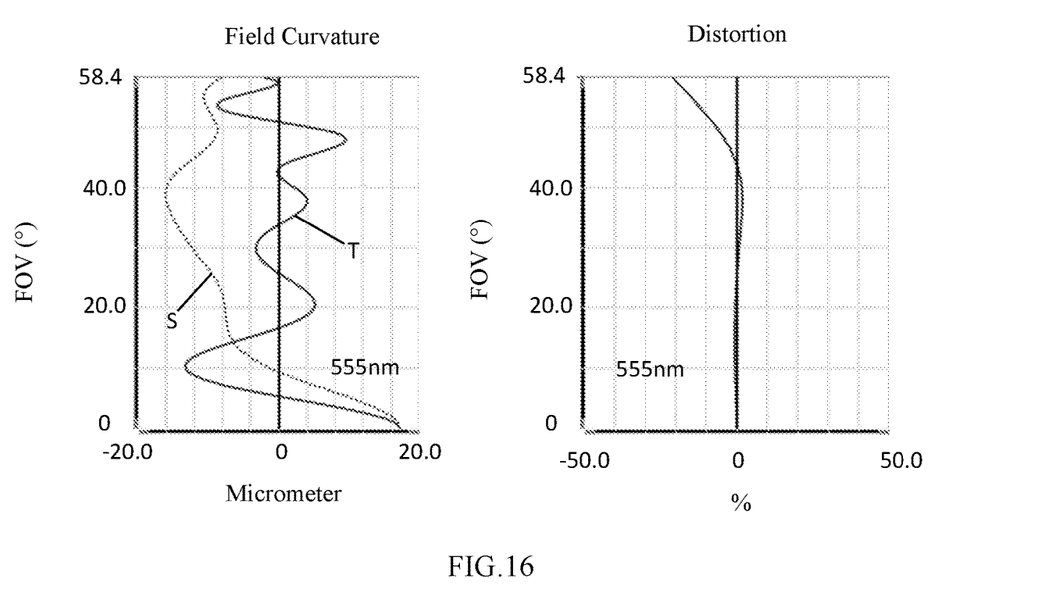
FIG. 16 is a schematic diagram of a field curvature and a distortion of the camera optical lens shown in FIG. 13.

FIG. 15 and FIG. 16 illustrate a longitudinal aberration and a lateral color of light with wavelengths of 650 nm, 610 nm, 555 nm, 510 nm, and 470 nm after passing the camera optical lens 40 according to Embodiment 4. FIG. 16 illustrates a schematic diagram of field curvature and distortion of light with a wavelength of 555 nm after passing the camera optical lens 40 according to Embodiment 4.

Table 17 below further lists various values of the present embodiment and parameters which are specified in the above conditions. Obviously, the camera optical lens according to the present embodiment satisfies the above conditions.

In the present embodiment, the entrance pupil diameter of the camera optical lens is 1.027 mm. The image height is 2.88 mm. The FOV along a diagonal direction is 116.9°. Thus, the camera optical lens 10 can provide an ultra-thin, wide-angle lens while having on-axis and off-axis aberrations sufficiently corrected, thereby leading to better optical characteristics.

TABLE 17

| Parameters and Conditions | Embodiment 1 | Embodiment 2 | Embodiment 3 | Embodiment 4 |
|---|---|---|---|---|
| f1/f | −2.99 | −1.79 | −1.50 | −1.88 |
| (R5 + R6)/(R5 − R6) | 0.55 | 0.10 | 1.00 | 0.97 |
| d8/d10 | 1.81 | 1.00 | 2.50 | 1.80 |
| f | 2.259 | 2.259 | 2.259 | 2.259 |
| f1 | −6.754 | −4.044 | −3.393 | −4.239 |
| f2 | 3.366 | 1.588 | 2.262 | 2.327 |
| f3 | −10.276 | −3.060 | −7.852 | −5.890 |
| f4 | 23.339 | 18378.555 | 126.639 | 129.682 |
| f5 | 1.725 | 3.801 | 1.790 | 1.613 |
| f6 | −2.054 | −10.602 | −2.306 | −2.024 |
| f12 | 5.252 | 1.865 | 3.974 | 3.661 |
| Fno | 2.20 | 2.20 | 2.20 | 2.20 |

In Table 17, Fno is an F number of the camera optical lens.

It can be understood that the above description is only embodiments of the present disclosure. In practice, those skilled in the art can make various modifications to these embodiments without departing from the spirit and scope of the present disclosure.

What is claimed is:

1. A camera optical lens, comprising, from an object side to an image side:
a first lens having a negative refractive power;
a second lens having a positive refractive power;
a third lens having a negative refractive power;
a fourth lens having a positive refractive power;
a fifth lens having a positive refractive power; and
a sixth lens having a negative refractive power,
wherein the camera optical lens satisfies the following conditions:

$$-3.00 \leq f1/f \leq -1.50;$$

$$0.10 \leq (R5+R6)/(R5-R6) \leq 1.00;$$

$$1.00 \leq d8/d10 \leq 2.50;$$

$$10.33 \leq f4/f \leq 12203.56;$$

$$29.96 \leq (R7+R8)/(R7-R8) \leq 184.95; \text{ and}$$

$$0.04 \leq d7/TTL \leq 0.14,$$

where
f denotes a focal length of the camera optical lens;
f1 denotes a focal length of the first lens;
f4 denotes a focal length of the fourth lens;
R5 denotes a curvature radius of an object side surface of the third lens;
R6 denotes a curvature radius of an image side surface of the third lens;
R7 denotes a curvature radius of an object side surface of the fourth lens;
R8 denotes a curvature radius of the image side surface of the fourth lens;
d7 denotes an on-axis thickness of the fourth lens;
d8 denotes an on-axis distance from an image side surface of the fourth lens to an object side surface of the fifth lens;
d10 denotes an on-axis distance from an image side surface of the fifth lens to an object side surface of the sixth lens; and
TTL denotes a total optical length from an object side surface of the first lens to an image plane of the camera optical lens along an optic axis.

2. The camera optical lens as described in claim 1, further satisfying the following condition:

$$0.70 \leq f2/f \leq 1.50,$$

where
f2 denotes a focal length of the second lens.

3. The camera optical lens as described in claim 1, further satisfying the following conditions:

$$0.52 \leq (R1+R2)/(R1-R2) \leq 2.00; \text{ and}$$

$$0.02 \leq d1/TTL \leq 0.08,$$

where
R1 denotes a curvature radius of an object side surface of the first lens;
R2 denotes a curvature radius of an image side surface of the first lens;
d1 denotes an on-axis thickness of the first lens; and
TTL denotes a total optical length from the object side surface of the first lens to an image plane of the camera optical lens along an optic axis.

4. The camera optical lens as described in claim 1, further satisfying the following conditions:

$$0.04 \leq R3+R4)/(R3-R4) \leq 0.75; \text{ and}$$

$$0.06 \leq d3/TTL \leq 0.27,$$

where
R3 denotes a curvature radius of an object side surface of the second lens;
R4 denotes a curvature radius of an image side surface of the second lens;
d3 denotes an on-axis thickness of the second lens; and
TTL denotes a total optical length from an object side surface of the first lens to an image plane of the camera optical lens along an optic axis.

5. The camera optical lens as described in claim 1, further satisfying the following conditions:

$$-9.10 \leq f3/f \leq 0.90; \text{ and}$$

$$0.02 \leq d5/TTL \leq 0.07,$$

where
f3 denotes a focal length of the third lens;
d5 denotes an on-axis thickness of the third lens; and
TTL denotes a total optical length from an object side surface of the first lens to an image plane of the camera optical lens along an optic axis.

6. The camera optical lens as described in claim 1, further satisfying the following conditions:

$$0.36 \leq f5/f \leq 2.52;$$

$$0.06 \leq (R9+R10)/(R9-R10) \leq 0.98; \text{ and}$$

$$0.04 \leq d9/TTL \leq 0.18,$$

where
f5 denotes a focal length of the fifth lens;
R9 denotes a curvature radius of the object side surface of the fifth lens;
R10 denotes a curvature radius of the image side surface of the fifth lens;
d9 denotes an on-axis thickness of the fifth lens; and
TTL denotes a total optical length from an object side surface of the first lens to an image plane of the camera optical lens along an optic axis.

7. The camera optical lens as described in claim 1, further satisfying the following conditions:

$$-9.39 \leq f6/f \leq -0.60;$$

$$1.24 \leq (R11+R12)/(R11-R12) \leq 9.26; \text{ and}$$

$$0.03 \leq d11/TTL \leq 0.13,$$

where
f6 denotes a focal length of the sixth lens;
R11 denotes a curvature radius of the object side surface of the sixth lens;
R12 denotes a curvature radius of an image side surface of the sixth lens;
d11 denotes an on-axis thickness of the sixth lens; and
TTL denotes a total optical length from an object side surface of the first lens to an image plane of the camera optical lens along an optic axis.

8. The camera optical lens as described in claim 1, further satisfying the following condition:

$TTL/IH \leq 1.85$, where

IH denotes an image height of the camera optical lens; and
TTL denotes a total optical length from an object side surface of the first lens to an image plane of the camera optical lens along an optic axis.

9. The camera optical lens as described in claim 1, further satisfying the following condition:

$FOV \geq 116°$, where
FOV denotes a field of view of the camera optical lens.

* * * * *